Dec. 22, 1964 G. W. McCARTY 3,162,255
VACUUM DUST-COLLECTING APPARATUS
FOR ROTATING HAMMER-DRILL
Filed Aug. 25, 1961 2 Sheets-Sheet 1

INVENTOR
GEORGE W. McCARTY

BY *Leonard Bloom*

ATTORNEY

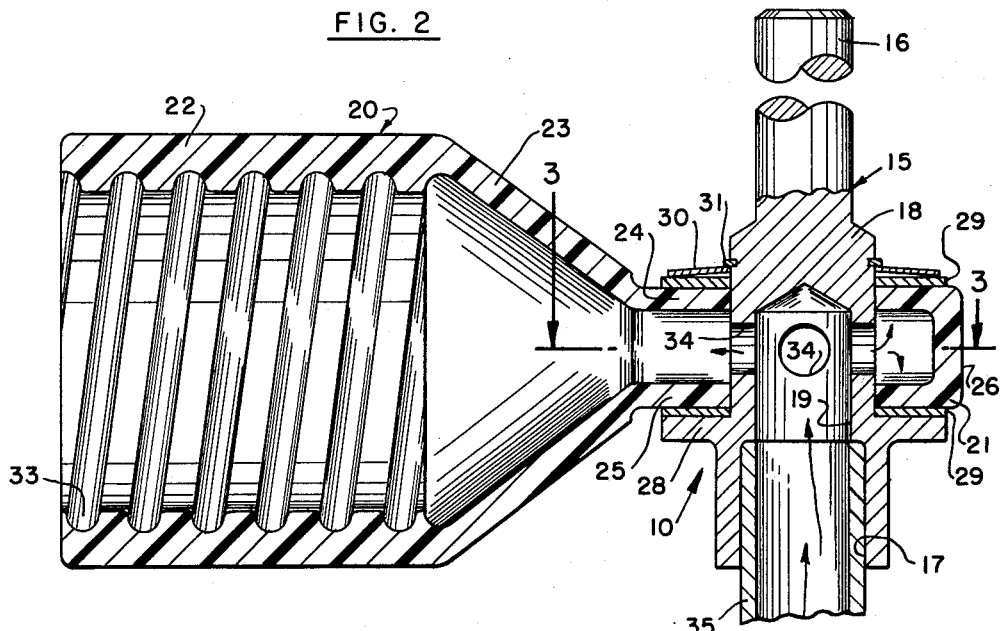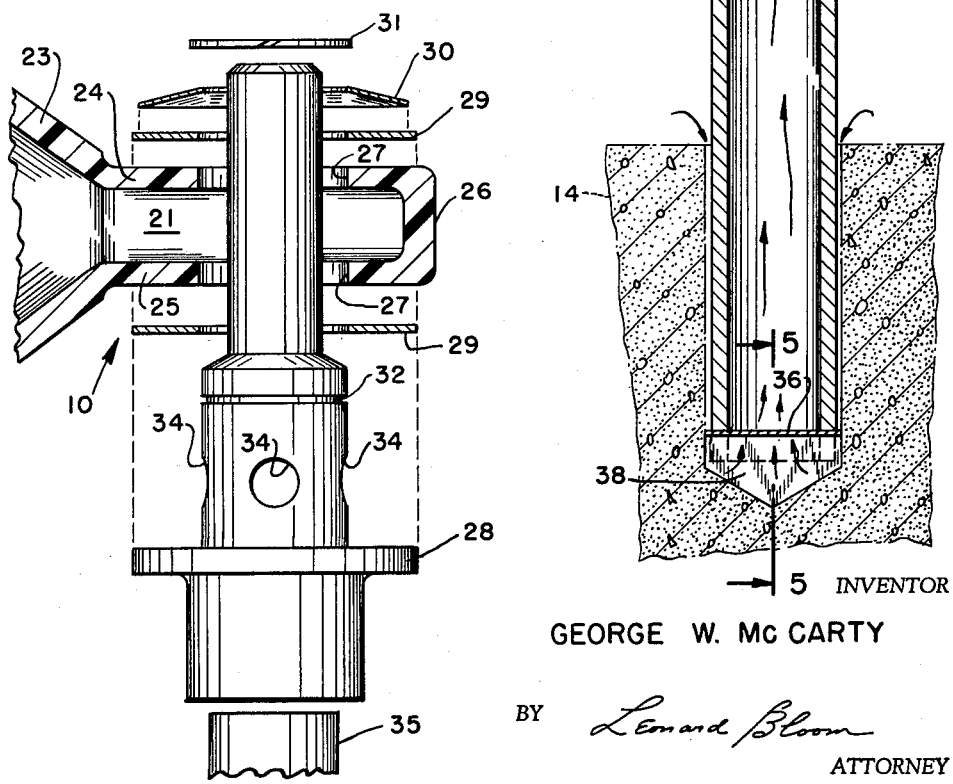

United States Patent Office 3,162,255
Patented Dec. 22, 1964

3,162,255
VACUUM DUST-COLLECTING APPARATUS FOR ROTATING HAMMER-DRILL
George W. McCarty, Towson, Md., assignor to The Black and Decker Manufacturing Company, Towson, Md., a corporation of Maryland
Filed Aug. 25, 1961, Ser. No. 133,986
1 Claim. (Cl. 175—213)

The present invention relates to a vacuum dust-collecting apparatus for a rotating masonry drill.

In the art of masonry drilling, the power-driven tools which are utilized generally devolve into the following three categories: one, a straight hammering or impacting action; two, a pure rotation or boring action; and three, a combination of the two, that is, a combination of both impacting and rotation. This latter method may involve a continuous impacting with an occasional rotation, inching, or oscillation of the drill bit, or else may involve a continuous rotation with an occasionally impacting being imparted to the bit. Usually the requirements or environment of the particular operation to be performed will dictate the method most desirable, but experience has shown that generally some combination of impacting and rotation of the drill bit is the most desirable from the standpoint of faster drilling rates.

In all masonry drilling methods, however, a considerable amount of dust and grit particles are invariably generated during the drilling operation; and this is disadvantageous in that it hampers the vision and efficiency of the operator, decreases the drilling rate progressively with the depth of hole being drilled, creates a bind between the drill bit shank and the hole being drilled (especially on deeper holes), tends to dull the drill bit and create excessive wear, necessitates that the hole be cleaned subsequent to the completion of the drilling operation, and spreads an offensive coating of dust and grit particles in the general area surrounding the drilling operation (thus affecting its usage in confinfied working areas in existing office buildings or similar structures).

Accordingly, it is an object of the present invention to provide a vacuum dust-collecting apparatus which will alleviate the aforementioned deficiencies, and which will be particularly suited to a masonry drilling method which involves at least some rotation or equivalent movement of the drill bit.

It is another object of the present invention to provide a vacuum dust-collecting apparatus for a rotating masonry drill which will facilitate increased drilling rates and considerably cleaner drilling operations.

It is yet another object of the present invention to provide, for use in conjunction with a rotating masonry drill, a vacuum dust-collecting apparatus which will allow the masonry drill to be utilized in existing installations without greatly interfering with the surrounding working area.

It is yet still another object of the present invention to provide, for use in conjunction with a rotating masonry drill, a vacuum dust-collecting apparatus that may be quickly and conveniently utilized by the operator.

It is a further object of the present invention to provide a vacuum dust-collecting apparatus that may be manufactured easily and inexpensively.

These and other objects of the present invention will become apparent from an examination of the following specification, taken in conjunction with the enclosed drawings, in which:

FIGURE 2 is an enlarged sectional view of the vacuum dust-collecting apparatus, showing (by means of small arrows) the flow of the dust and grit particles;

FIGURE 4 is an exploded view of the various components of an integral portion of the vacuum dust-collecting apparatus;

Figure 1:
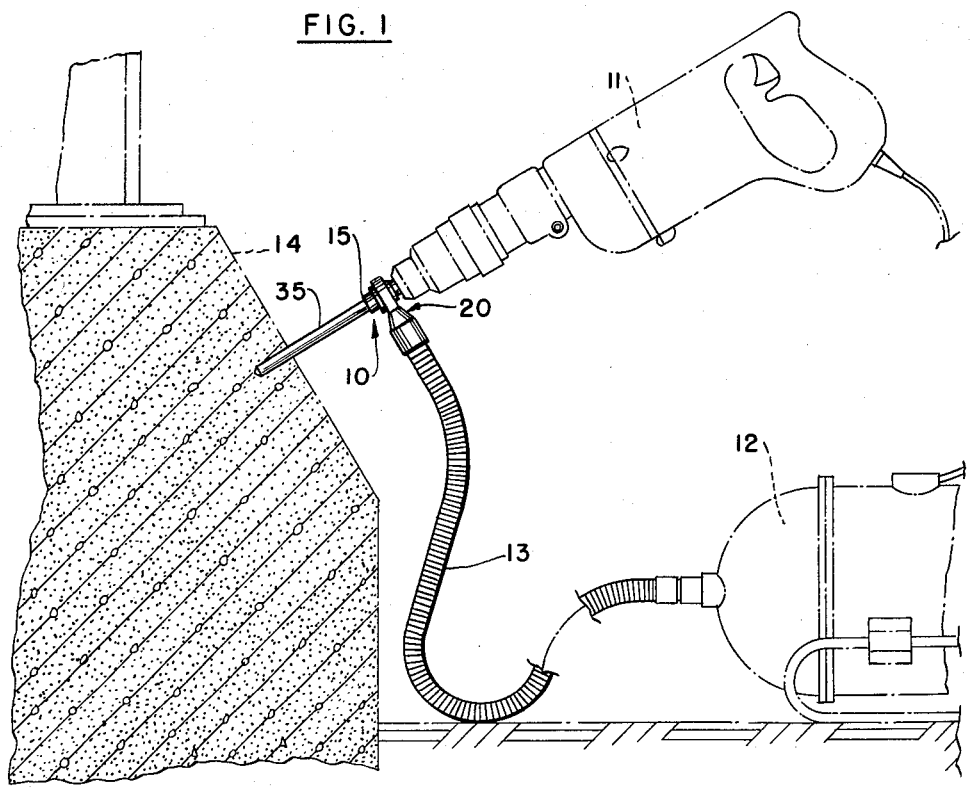
FIGURE 1 is an elevational view of the complete vacuum dust-collecting apparatus in actual usage, showing its relationship to a suitable power-driven tool and a conventional portable vacuum cleaner.

With reference to FIGURE 1, there is illustrated the vacuum dust-collecting apparatus 10, one portion of which is coupled to a suitable power-driven tool 11, and another portion of which is coupled to a conventional portable vacuum cleaner 12 (or suitable source of suction) by means of a vacuum cleaner hose 13. The power-driven tool 11 may be of the type illustrated in the copending Short application Ser. No. 114,735, filed June 5, 1961, now Patent No. 3,119,274, entitled "Power-Driven Tool for Drilling or Impact-Drilling," and assigned to the same assignee as that of the present invention; but it will be understood that any suitable power-driven tool, involving at least some rotation of the drill bit, may be employed in conjunction with the vacuum dust-collecting apparatus 10. Thus, the apparatus 10 facilitates the drilling of a block 14 of concrete or other masonry material in a manner hereinafter to be described in detail.

With reference to FIGURES 1, 2, 3, and 4, the vacuum dust-collecting apparatus 10 includes a generally cylindrical chuck body 15; and the chuck 15 comprises a driven shank 16 formed on one end for coupling the chuck 15 to the driving tool 11, a socket 17 formed on the opposite end of the chuck 15, and a cylindrical main body portion 18 intermediate the shank 16 and socket 17. The main body portion 18 of the chuck 15 has a blind axial bore 19 which communicates with the socket 17. A stationary substantially-hollow hose coupling member 20 is provided, and preferably, the member 20 is molded from a suitable plastic material. The hose coupling member 20 comprises an inner portion 21 fitted about the chuck 15, an external portion 22 for coupling the member 20 to the hose 13, and an integral funnel-shaped transition portion 23 intermediate the inner portion 21 and outer portion 22. The inner portion 21 of hose coupling member 20 includes a pair of parallel walls 24 and 25 being joined together by a continuous peripheral wall 26 to form an internal chamber therebetween. Each of the pair of parallel walls 24 and 25 has a circular aperture or hole 27 formed therein, and the holes 27 are aligned with respect to each other. The main body portion 18 of the chuck 15 has an external annular flange 28 formed thereon intermediate to the socket 17 and the driven shank 16, and the inner portion 21 of the hose coupling member 20 is fitted about the main body portion 18 of the chuck 15 and against the external annular flange 28. The cylindrical main body portion 18 of the chuck 15 passes through the holes 27 in the inner portion 21 of the hose coupling member 20; and there is sufficient clearance therebetween to allow the chuck 15 to be rotated (the hose coupling member 20 being stationary), yet the coupling of the member 20 to the chuck 15 is sufficiently close to provide a relative air-sealing engagement between the chuck 15 and the hose coupling member 20. Two washers 29

(preferably of bronze) are disposed against the parallel walls 24 and 25; and the inner portion 21 of the hose coupling member 20 is held against the flange 28 by means of a resilient cone-type lock washer 30 and a resilient split-ring 31, the latter being received within an external annular groove 32 formed in the main body portion 18 of the chuck 15. The external portion 22 of the hose coupling member 20 comprises a hollow cylinder having internal threads 33 formed therein for coupling the member 20 to the hose 13. The cylindrical main body portion 18 of the chuck 15 is provided with a plurality of circumferentially-spaced radial openings 34 equally-spaced around the main body portion 18; and the radial openings 34 are axially disposed along the main body portion 18 between the pair of parallel walls 24 and 25 of the inner portion 21 of the hose coupling member 20, thus establishing a communication between the blind axial bore 19 and the interior of the hollow hose coupling member 20. A hollow drill shank 35, preferably tubular, is securely mounted within the socket 17 of the chuck 15 by brazing or other means; and the dirt and grit particles (as indicated by the arrows showing the air flow pattern) are passed interiorly of the tubular drill shank 35 into the blind axial bore 19 of the main body portion 18 of the chuck 15, and thence via the openings 34, into the hose coupling member 20 for ultimate passage, via the hose 13, to the vacuum cleaner 12.

Figure 5:
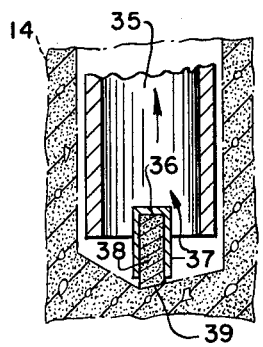
FIGURE 5 is a view taken along the lines 5—5 of FIGURE 2, showing the mounting of a suitable drill bit to the tubular drill shank.
Figure 6:
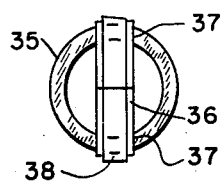
FIGURE 6 is an end elevational view of the drill bit and tubular shank illustrated in FIGURE 5.

With reference to FIGURES 5 and 6, the drill bit means, which is included on the end of the tubular drill shank 35, comprises a channel-shaped receptacle 36 having an open portion; and means including a pair of aligned rectangular slots 37 are formed on the end of the tubular drill shank 35 for securing the channel-shaped receptacle 36 to the shank 35. The slots 37 are formed diametrically opposite from one another (see FIGURE 6), and each of the slots 37 open outwardly of the shank 35. Hence, the channel-shaped receptacle 36 is received within the slots 37 with the open portion of the receptacle 36 being accessible externally of the shank 35, and with the receptacle 36 protruding partially beyond the end of the shank 35; and a carbide drill bit insert 38 is secured within the receptacle 36 and has a portion protruding beyond the receptacle 36. The drill bit insert 38 may be secured within the receptacle 36, as well as the receptacle 36 within the slots 37 in the shank 35, by any suitable method such as brazing. Moreover, a cutting edge 39 (in the order of 20°) is provided on the drill bit insert 38.

Figure 7:
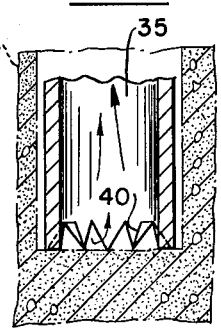
FIGURE 7 is a view corresponding to that of FIGURE 5, but showing an alternate means of forming cutting teeth on the tubular shank.
Figure 3:
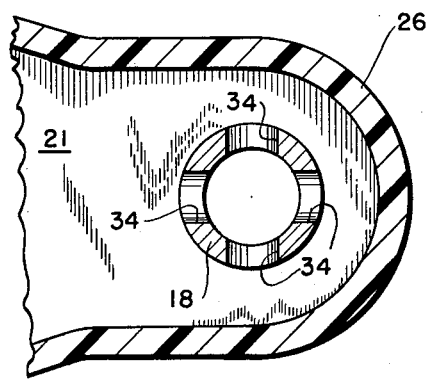
FIGURE 3 is a view taken along the lines 3—3 of FIGURE 2.
Figure 8:
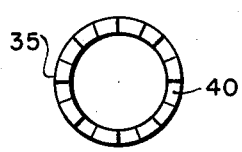
FIGURE 8 is an end elevational view of the alternate drill bit illustrated in FIGURE 7.

With reference to FIGURES 7 and 8, there is illustrated an alternate embodiment of the drill bit means comprising a plurality of circumferentially-spaced cutting teeth 40 formed on the end of the tubular drill shank 35, and preferably, the teeth 40 are suitably hardened in a manner known to the prior art.

Obviously, many modifications may be made without departing from the basic spirit of the present invention; and therefore within the scope of the appended claim, the invention may be practiced other than has been specifically described.

I claim:

Vacuum dust-collecting apparatus for a power-driven rotating hammer, comprising, in combination:
 (a) a substantially-cylindrical rotating chuck body having one end driven by the hammer and the opposite end provided with a socket to receive a hollow drilling tool;
 (b) an external annual flange formed intermediately of the ends of said chuck body;
 (c) a hollow stationary hose coupling member comprising:
  (1) a substantially-cylindrical portion having means for connection with a flexible vacuum hose;
  (2) a substantially funnel-shaped transition portion which converges away from said cylindrical portion; and
  (3) a substantially-flat portion comprising:
   (aa) a pair of parallel walls having respective alined circular apertures formed therein;
   (bb) said flat portion resting upon said external annular flange of said chuck body and closely engaging the outer cylindrical surface of said body; and
   (cc) a continuing peripheral wall portion joined integrally with said parallel walls to form a dust-collecting chamber;
 (d) means including an axial bore leading from said socket and a communicating radial canal formed in said chuck body to communicate the interior of the hollow drilling tool with said chamber;
 (e) means including a resilient washer to constantly urge said flat portion of said hose coupling member against said external annular flange of said chuck body; and
 (f) means to retain said resilient washer and said hose coupling member to said chuck body.

References Cited in the file of this patent

UNITED STATES PATENTS

| | | |
|---|---|---|
| 895,228 | Bartlett | Aug. 4, 1908 |
| 2,918,260 | Tilden | Dec. 22, 1959 |
| 3,022,840 | Hohos et al. | Feb. 27, 1962 |

FOREIGN PATENTS

| | | |
|---|---|---|
| 176,195 | Austria | Sept. 25, 1953 |

UNITED STATES PATENT OFFICE
CERTIFICATE OF CORRECTION

Patent No. 3,162,255 December 22, 1964

George W. McCarty

It is hereby certified that error appears in the above numbered patent requiring correction and that the said Letters Patent should read as corrected below.

Column 1, line 39, for "confinfied" read -- confined --; column 4, line 15, for "annual" read -- annular --; line 33, for "continuing" read -- continuous --.

Signed and sealed this 3rd day of August 1965.

(SEAL)
Attest:

ERNEST W. SWIDER
Attesting Officer

EDWARD J. BRENNER
Commissioner of Patents